Aug. 2, 1960     A. P. BLOXSOM     2,947,240
COOKING MEANS
Filed May 17, 1955     3 Sheets-Sheet 1
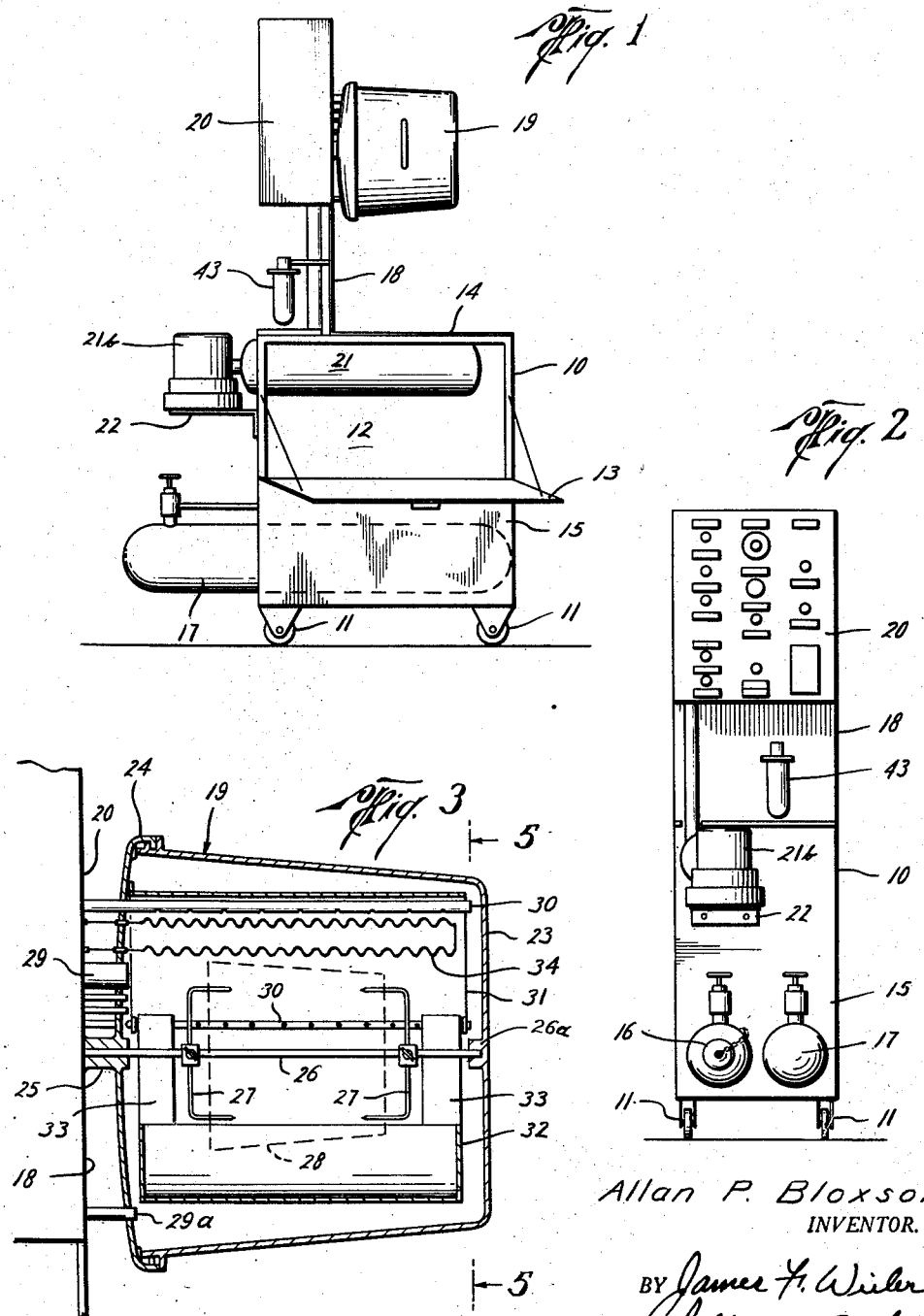
Allan P. Bloxsom
INVENTOR.
BY
ATTORNEYS

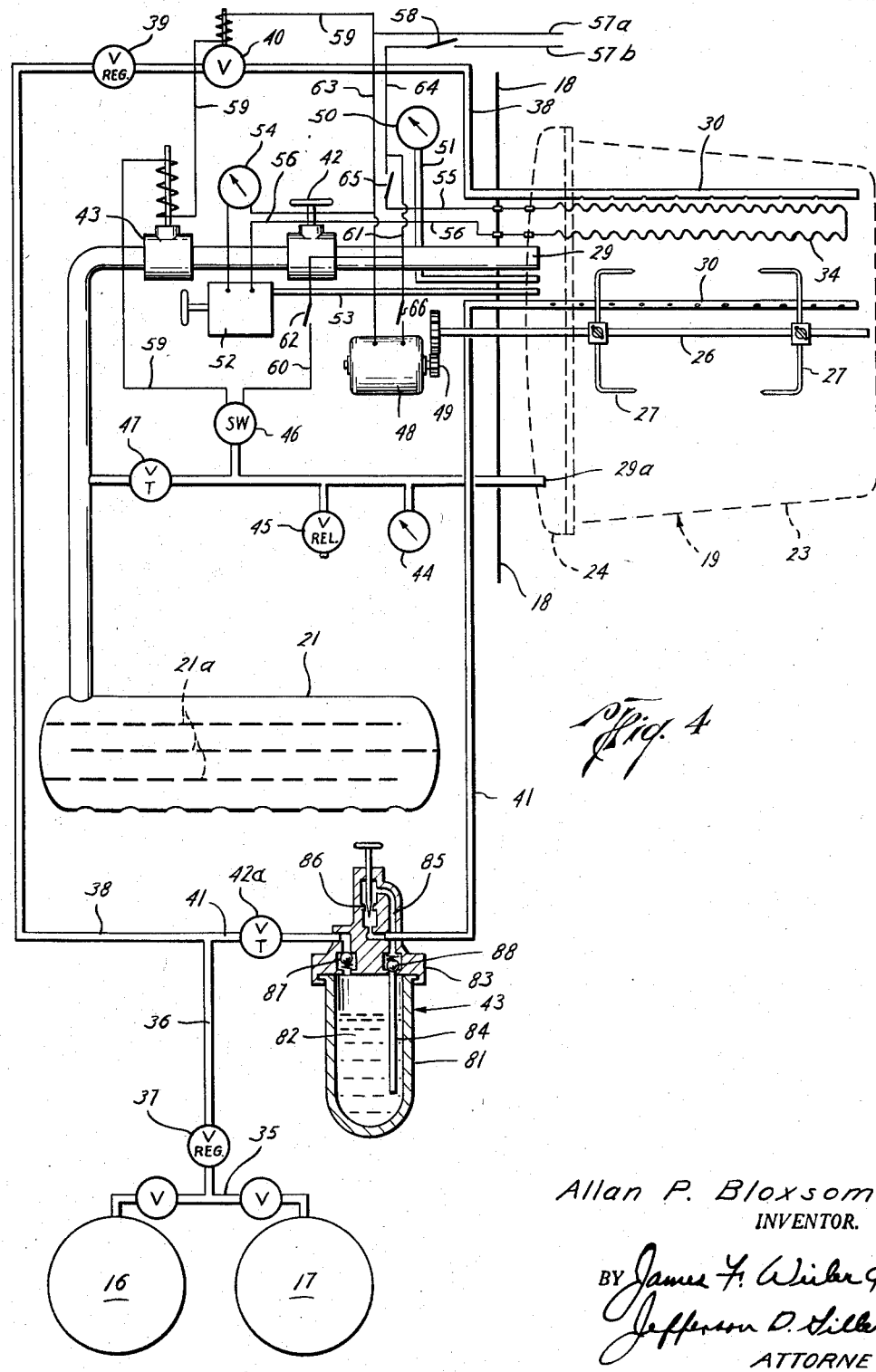

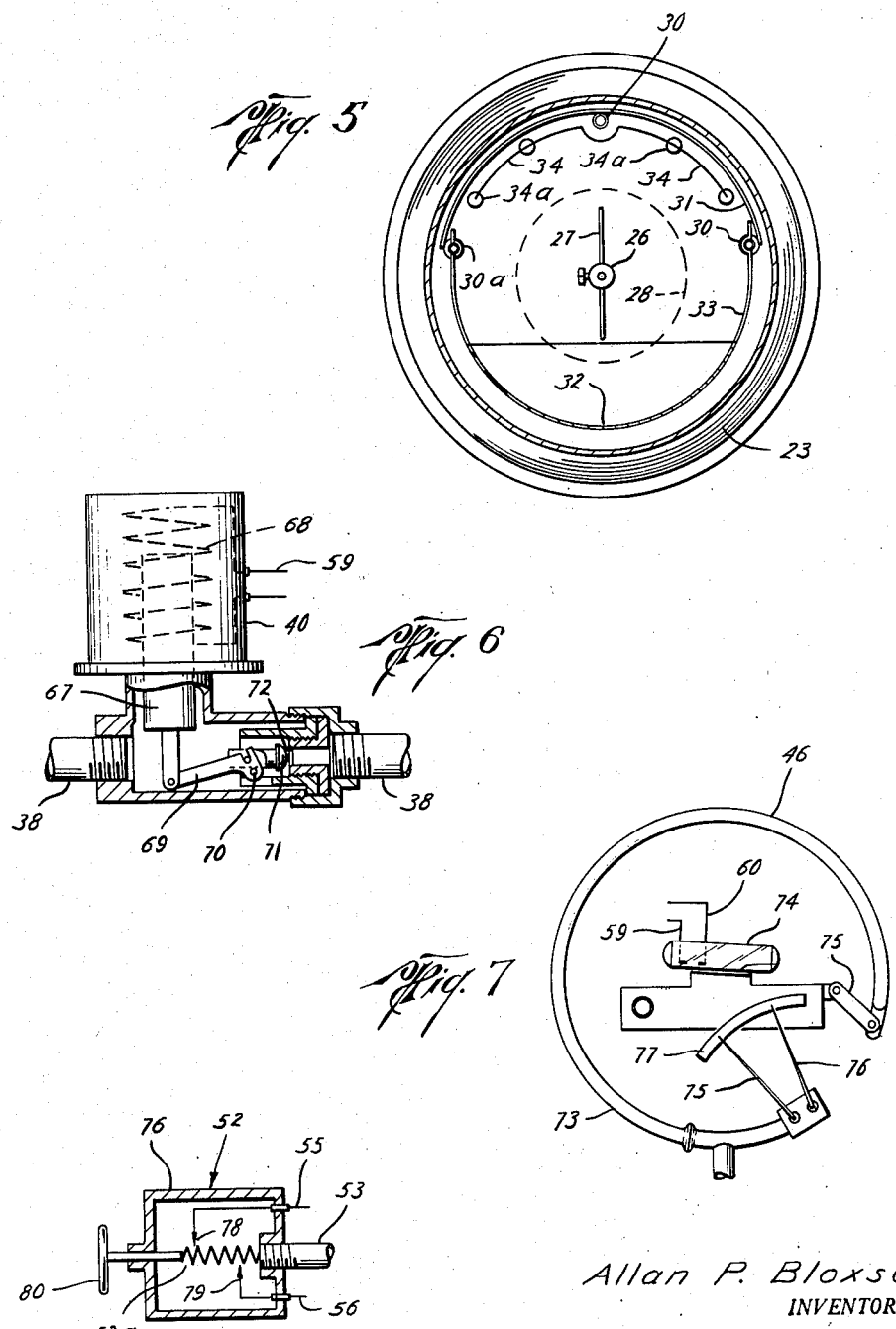

United States Patent Office 2,947,240
Patented Aug. 2, 1960

2,947,240
COOKING MEANS
Allan P. Bloxsom, 4402 Travis, Houston, Tex.
Filed May 17, 1955, Ser. No. 508,845
7 Claims. (Cl. 99—333)

The present invention relates to new and improved methods of and means for cooking and, more particularly, relates to such methods of and means for cooking which includes a variety of different combinations of physical and chemical factors for the better preparation of foods, particularly meats.

In cooking an altered physical appearance of food for palatability is obtained without changing to a great extent the caloric value. Up to the present time, the physical appearances and palatability have been changed by rate, time, and open or closed methods of cooking. There are essentially two methods of modifying the appearance and taste of a food, such as meat.

A first method in current use conserves and retains the juices and flavors in the meat itself by employing a high initial temperature to sear its exterior to provide a retaining wall to keep the juices in its interior. This method is frequently modified by using a lower temperature in the later stage of cooking to prevent burning or drying of the meat. The appearance and palatability of the meat is changed with cooking and sterilization, but with the exception of the loss of some fat that escapes from the meat while cooking there is little effect produced on its nutritive value.

A second method reverses the steps in the first method in that a low temperature is used at first to dissolve a highly flavored substance (extractive) in the water of the meat from the protein content, and time is allowed for oxidation under high temperature to extend the flavors. In this method the meat loses considerable moisture, varying from about 18% to about 68%. It will lose also a portion of the extractives, even though the total amount of extractives might be increased by time and slow cooking. This is particularly true if cooking is carried out over a barbecue pit where outside flavors may be taken up by the meat through convection in the cooking gases.

Hot gases from the source of heat for cooking play an important part in the end product in cookery. For example, the hot gases from an electric grill are composed essentially of 20% oxygen and 80% nitrogen. The hot gases from an open fireplace vary from about 15% to about 5% oxygen with about 5% to about 15% carbon dioxide and about 80% nitrogen. In addition, there are different flavors in the smoke that may be taken up by the meat.

Cookery primarily consists in the changing (coagulation) of the protein of the meat. In addition, the moisture present under heat converts a part of the albuminoid connective tissue to gelatin. The coagulation of the protein starts at about 52° C. and is almost complete at 100° C. As the temperature increases above the boiling point, the meat begins to brown and to develop characteristic flavors. These flavors are produced only by dry heat, as in broiling or roasting, and occasionally oxidation may make them unpleasant. The "browning" is due in part to the breaking down of the proteins and fats which, as mentioned, helps to bring out the flavors. Also, there is oxidization of some of the extractives which either adds or occasionally mars the flavor.

The extractives are organic compounds and are of two general classes, nitrogenous and non-nitrogenous, and arise from muscle tissue. They are readily soluable in water, and may be removed from meat up to 72%, which explains the flat and insipid taste of boiled meat. The nitrogenous extractives are present in meats up to 0.7% and are chiefly creatin, and the purine bodies xanthin and hypoxanthin. The origin of the purine bodies is nucleic acid which is formed in the hydrolysis of nucleo-proteins. Lactic acid is the non-nitrogenous extractive.

Since extractives are abundant in the flesh of birds and most game, the flavors of those foods are pronounced. Flavors, pleasant or otherwise, can be developed in meats by allowing them to "hang," thus, some of the proteins in the meat have time to break down and form extractives. The amounts of these extractives depend also upon the age of the animal and the character of its food. In young animals, the extractives are not highly developed and the flesh has a less pronounced flavor. The extractives of muscle tissue stimulates the secretion of gastric juices, but apparently do not furnish the body with energy or building material. Thus, apart from the stimulation of the gastric juices, they have no function.

The color of meat comes from a pigment myochrome of myelematin, which is closely related to hemoglobin, and to a great extent, exists in the fluid in the meat.

Fats also undergo a change in cooking, the character and extent depending naturally on the method of cooking employed. Moist heat hydrolyses a portion of the fat and browns that most directly exposed to the heat. If the temperature is too high, "burning" of the fat results in the formation of acrolein. This produces an unpleasant sharp odor and taste that detracts from the sweetness of the meat.

Cooking lessens the weight of meat. The loss is principally water, even when the meat is boiled. Roasting also considerably decreases the amount of fat. The losses in pan boiling are less than boiling, roasting or sauteing.

With the above processes that occur in cooking in mind, ideally, one should be able to tenderize, control the rate of coagulation of protein, decrease or increase the formation of extractives, decrease or increase "browning," decrease or increase loss of fats, decrease or increase loss of water, and control color changes.

It is therefore an object of the present invention to provide an improved method of and means for cooking in which the food is tenderized, the rate of coagulation of the protein is controlled, the formation of extractives, browning, loss of fats, loss of water is decreased or increased as desired, and color changes are controlled.

A still further and general object of the present invention is the provision of a method of and means for cooking which overcomes the mentioned disadvantages of prior and current methods of and means for cooking.

A still further object of the present invention is the provision of such an improved method of and means for cooking in which complete control is effected over the cooking operation at all times so that the desired end product may be obtained.

A still further object of the present invention is the provision of a method of and means for tenderizing of food by explosive changing of pressures during cooking or before the start of cooking.

A still further object of the present invention is the provision of a method of and means for cooking which prevents burning.

A still further object of the present invention is the provision of a method of and means for cooking rapidly by using a highly diffusible gas for cooking purposes.

A still further object of the present invention is the provision of a method of and means for cooking by using a non-oxidizing gas to reduce the formation of extractives.

Yet a further object of the present invention is the provision of an improved method of and means for cooking in which selective variations of pressures in cooking are used to eliminate objectionable or excessive amounts of extractives.

Still a further object of the present invention is the provision of an improved method of and means for cooking in which selective variations in pressures are used to impart to foods desired flavors.

A still further object of the present invention is the provision of a method of and means for cooking by which desired color changes are produced by the prevention of undesired color changes or oxidation.

A further object of the present invention is the provision of an improved method of and means for cooking in which maximum amount of fluids are retained in the food or a maximum amount of fluids in fats are expressed from the food, as desired.

A still further object of the present invention is the provision of cooking apparatus that can function as an open rotisserie or as a closed pressure oven in any period of a cooking process.

Still a further object and feature of the present invention is the provision of an improved process of and means for maintaining maximum amounts of water in the food through a chemical process in the formation of carbonic acid.

Other and further objects, ends, features and advantages will be apparent from the following detailed description of presently preferred examples of the invention.

The present invention includes methods of and means for cooking under cycling or steady pressures, using normal or reduced oxygen tensions, over a part of or the entire period of cooking. The oxygen tensions are reduced or replaced entirely by a gas, carbon dioxide, that is found in various concentrations in open wood flame cooking. This gas is highly diffusable, much more so than oxygen or nitrogen, though a little less rapid heat convectable. In addition, it does, by forming a chemical compound, carbonic acid, retain moisture in the cooking substance. Thus, additional physical and chemical factors are used at any stage in the cooking and preparation of foods and the invention contemplates a wide variety of different combinations of physical and chemical factors for the better preparation of foods, particularly meats.

The methods according to the invention may best be understood in connection with an apparatus constructed according to the invention, a presently preferred example of which is illustrated in the accompanying drawings, where like character references designate like parts throughout the several views, and where Figure 1 is a front elevational view diagrammatically illustrating an apparatus according to the invention, Figure 2 is a side elevational view of the left hand side of the apparatus illustrated in Figure 1, Figure 3 is a fragmentary side view, partly in section, illustrating the oven of the apparatus of Figure 1, Figure 4 is a flow and circuit diagram of the apparatus of Figure 1, Figure 5 is a cross-sectional view of the oven taken along line 5—5 of Figure 3, Figure 6 illustrates a suitable electromagnetic lever action or motor valve for use in the system, Figure 7 is a side elevation illustrating a Bourdon tube power element, and Figure 8 is a fragmentary, side view illustrating a suitable thermostat for connection in series with the timer in the system.

Referring to the drawings and particularly to Figures 1 and 2, the apparatus is mounted on a suitable device or frame, such as the cabinet 10 mounted on the rollers 11, which cabinet has the compartment 12, door 13 and upper work shelf 14. Obviously, any type suitable cabinet, tray or frame may be utilized to support the various elements of the structure.

The lower portion of the cabinet includes a receptacle 15 for carrying a pair of gas cylinders, such as the $CO_2$ cylinder 16 and the air cylinder 17. The cylinder 16 is here shown as a $CO_2$ converter into which "Dry Ice" is placed to form $CO_2$ gas. A frame 18 is provided which extends from the upper surface of the cabinet 10 and supports the oven 19, and the control panel 20 and elements therein. A muffler 21 is supported in the cabinet 10. To this end the discharge portion of the muffler 21b is supported by means of a bracket 22. A lubricator 43 is also supported by the frame 18. This lubricator is connected to the oven to act as a baster.

Thus, all of the elements of the apparatus are supported and carried by the stand or cabinet 10 and the entire unit is portable so that it is readily transported from place to place, if desired.

Turning now to Figures 3 and 5, the oven 19 is illustrated and includes a pressure cylinder 23 which is detachably secured to a cover 24 in any preferred manner, such as by interlocking lugs, not shown, the cover 24 being mounted by the support 25 on the frame member 18.

A removable spit 26 rotatably extends through the support 25 and cover 24 and is supported at its free end by the boss 26a of the cylinder 23. The rotatable spit 26 is provided with two adjustable arms 27 for securing the food on the spit, such as indicated by the dotted lines 28. Any suitable or preferred means may be employed, however, for supporting the food in the oven 19. A pair of exhaust pipes 29 and 29a extend through the cover 24 and from the pressure cylinder 23 for removal of exhaust gases, the upper exhaust pipe 29 being of relatively large diameter for rapid exhaust of gases from the oven 19.

A pair of inlet pipes 30 are provided which extend through the cover 24 and to the interior of the pressure chamber 23 for inflow of gases as desired. The uppermost inflow pipe 30 supports a highly polished, semicylindrical, heat reflector 31 and the intermediate inflow pipe 30 and support 30a support a drip tray 32 disposed in the lower portion of the pressure cylinder 23 by means of the supports 33. Obviously, any preferred means may be utilized to support the reflector 31 and drip pan 32.

A heating element 34 is supported by the supports 34a in the upper portion of the pressure cylinder 23 for supplying the required heat for cooking.

The various parts of the apparatus and their arrangement with respect to one another are best illustrated in Figure 4, and turning now to this figure, it is seen that a carbon dioxide converter or $CO_2$ cylinder 16 and air cylinder 17 are connected by means of the valved manifold 35 and flow line 36 through the reducing valve and gauge 37 to the flow line 38 through the hand valve 39 and through an electromagnetic or motor valve 40 into the inlet line 30. By adjusting the hand valve 39 it may serve as a choke to regulate inflow of gas into the inlet line 30.

The flow line 36 is also connected to the flow line 41 which includes a manually actuated valve 42a and air line lubricator 43 serving as a baster for connection to the intermediate inlet pipe 30 adjacent the central portion of the pressure chamber 23. The flow line 41 and intermediate inlet pipe 30 serve as an auxiliary line for basting purposes; although, additional gas is supplied to the oven 19 by this line.

Thus, either air, or $CO_2$ or a combination of both may flow into the pressure cylinder 23 in either one or all of the inlet lines 30.

A hand valve 42 is provided in the large exhaust line 29 and an electromagnetic lever action or motor valve 43 is also provided to control the outflow of exhaust gases in the large exhaust line 29. By regulating the hand valve 42 it may serve as a choke to regulate the outflow of gas in the exhaust line 29.

In the smaller exhaust line 29a, there is provided a pressure gauge 44, a safety valve 45 and an automatic pressure switch 46 which is connected to the electromagnetic or motor valves 40 and 43 for actuating the same. Also, a hand valve 47 is provided in the small exhaust line 29a.

An electric motor 48 is provided which is connected through the gearing 49 to the spit 26 for rotating the same.

A thermometer 50 is connected to the thermometer tube 51 to the pressure cylinder 23 by extending through the cover 24 and a thermostat 52 is provided which is connected by the thermostat tube 53 to the interior of the pressure cylinder 23 by extending through the cover 24. In addition, a timer 54 is provided which is electrically connected to the thermostat and heating element 34 by means of the electrical conductors 55 and 56.

The various electrical elements of the apparatus are energized from a suitable source of power, not shown, through the conductors 57a and 57b which include the switch 58 in the conductor 57b, the magnetic or motor switches 40 and 43 being connected by means of the circuit composed of the conductors 59 through the pressure switch 46 and conductor 60 which is connected by means of conductor 64 back to the conductor 57b thereby completing the circuit. A switch 62 is provided in conductor 60.

It is noted that the circuit is completed through the heating element 34, timer 54, and thermostat 52 by means of the electrical conductors 55 and 56 being connected to the conductors 63 and 64, the latter having the switch 65 therein. It is noted also, that the circuit is completed to the motor 48 by means of the conductors 63 and 64 in its continuation 61, the latter having the switch 66 therein.

In connection with the various electrical elements, valves, thermostats and the like, it is understood that all these elements are old as such, are in widespread commercial use and are readily available on the commercial market. Merely for the purpose of illustration, however, reference is made to Figure 6 which illustrates a suitable electromagnetic or motor valve suitable for use as indicated as motor valve 40 and 43. Turning now to this figure it is seen that a solenoid 67 is disposed within the coil 68 connected to the conductor 59. The solenoid is connected by the crank arm 69 to a fixed pivot 70 and to the valve 71 which seats on the valve seat 72. Thus, as the solenoid 67 is moved in response to energization or de-energization of the coil 68 the valve 71 is moved to and away from the valve seat 72. In this connection, it is noted that the valves 40 and 43, see Figure 4, are so arranged that one opens as the other closes. Obviously, any desired motor valve may be utilized for the purpose for example, a General Controls K–10 magnetic lever action valve SD1–10–3 is satisfactory for the purpose.

Similarly, with respect to the pressure control 46. For illustration, however, a type of pressure control switch is illustrated in Figure 7 which is of the Bourdon tube type. Turning now to this figure, a Mercoid Type DA–31 Pressure Control is illustrated which includes the Bourdon tube 73, which is the power element, which is connected to the mercury switch 74 by means of the crank arm 75 so that as the Bourdon tube 73 moves in response to pressure it causes the mercury switch 74 to bridge the contacts or not bridge the contacts connected to the electrical conductors 59 and 60 for opening and closing the circuit connected thereto. A dual adjustment is possible with the minimum and maximum setting arms 75 and 76, respectively, on the scale 77. It is thought that no more detailed description of this is necessary in view of the fact that it is a conventional control readily available on the market and numerous pressure controls are satisfactory for the purposes of the present invention.

Any suitable type of thermostat may be used, for example a Fenwall thermostat or other commercial makes may be used and, for the purpose of illustration, one such thermostat is illustrated in Figure 8. Turning now to this figure a suitable thermostat is illustrated which includes the housing 76 in which is disposed the coil 77 and the electrodes 78 and 79 connected to the electrical conductors 55 and 56, respectively, which are connected through the timer 54 to the heating elements 34, as illustrated in Figure 4. An adjustment screw 80 is provided for setting of the thermostat. It is thought that no more detailed description is necessary as any conventional and preferred thermostat may be used.

Turning now to Figure 4, the lubricator 33 which functions as a baster may be of any desired type and may include the removable bowl 81 to contain the liquid 82. Gas enters through the head 83 and flows through the liquid 82 and up through the tube 84 and passage 85 through the choke 86 into the line 41. The check valves 87 and 88 are provided to prevent backflow and the choke 86 is adjustable to regulate the rate of flow. Obviously, any type lubricator may be used as desired or this may be omitted if desired.

The operation of the apparatus is best understood in connection with various processes of cooking. The following examples are representative and illustrate methods of cooking according to the invention and the operation of the apparatus described.

*Example I*

A first process comprises rapid cycling of pressures at relatively high pressure and over a narrow range of pressures to produce rapid cooking with a minimum amount of burning or formation of acrolein in thin, fatty meats, such as bacon. In this instance $CO_2$ is used.

The thin, fatty meat, such as bacon is attached to the spit 26, the drip pan 32 attached and the pressure cylinder 23 secured to the cover 24. The bleeder valve 47 is closed and the valve 42 of the large exhaust pipe 29 is opened. The main switch 58 is closed thereby providing electrical energy to the various elements. The spit motor 48 is started by closing the switch 66 and the pressure switch 46 is energized by closing the switch 62. The action switches 75 and 76 are set over a small range, for example, five pounds. The valve to the $CO_2$ converter or cylinder 16 is opened to the intake line 36 and the valve to the air cylinder 17 is closed. Thus, $CO_2$ is supplied into the pressure cylinder 23 until such time as there is a maximum pressure therein, which causes the pressure switch 46 to actuate the motor valves 40 and 43 closing the inlet motor valve 40 and opening the discharge motor valve 43 thereby permitting gas to escape rapidly from the pressure cylinder 23 through the large exhaust 29 and be discharged through the muffler 21 until such time as a minimum pressure, as set on the pressure switch 46, is reached at which time the motor valve 40 is opened and the motor valve 43 is closed to permit inflow of gases into the pressure cylinder 23 and prevent outflow in the large exhaust pipe 29. It is noted that at all times, $CO_2$ may be supplied to the pressure cylinder 23 through the inflow line 38.

Preferably, cycling with $CO_2$ is done to eliminate $O_2$ in the oven, at which time switch 65 to the timer 54 and thermostat 52 is closed and the timer 54 is adjusted for the desired length of time of cooking. When through, the valve to the $CO_2$ converter or cylinder 16 is closed and the bleeder valve 47 is opened to permit pressure to be bled from the pressure chamber 23. The pressure cylinder 23 may then be removed and the meat taken from the spit 26.

*Example II*

A second process includes a slow build-up of pressure with a rapid instantaneous release of pressure over a wide range of pressures before cooking is started for the tenderizing through stretching of the food fibers by the escape of trapped gases in the food. This is particularly useful in the processing of meats that may be tough. For this process, the food is attached to the spit 26, the drip pan 32 and pressure cylinder 23 attached, the bleeder valve 47 and main valve 42 are closed and opened, respectively, as mentioned in Example I. The spit motor 48 is started as previously described and action switches 75 and 76 of the power switch 46 are set over a wide range, for example from atmosphere to about twenty-one pounds. The valve to the $CO_2$ converter or cylinder 16 is opened and the valve 39 is adjusted to allow $CO_2$ to enter the oven 19 slowly. The relatively slow build-up and fast release is provided by the opening and closing of the motor valves 40 and 43 as controlled by the pressure switch 46. After cycling for a short period of time, for example after all the oxygen is eliminated from the oven, switch 65 to the thermostat 52 is closed, the timer 54 is set for the cooking period. After the cooking period the valve on the converter or $CO_2$ container 16 is then closed and the bleeder valve 47 is opened to permit pressure to be bled from the oven 19. The pressure cylinder 23 is then removed and the food taken from the spit 26.

*Example III*

A still further example of a method of the invention and the operation of the apparatus of the invention includes a slow build-up of pressure with a slow release of pressure over a wide range of pressures which is useful for the rapid cooking of meats conserving a maximum of water in the meat and minimizing the loss of fats in water. No oxidization of extractives to detract from those already present takes place and the only extractives that are formed are those formed by heating. This process is similar to that of Example II except that the valve 42 in the exhaust pipe 29 is opened slightly thereby preventing rapid escape of gases from the pressure chamber or oven 19.

*Example IV*

A still further example comprises a high pressure cooking, but slow build-up of pressure with a rapid instantaneous release of pressure over a wide range of pressure after cooking is started when it is desired to eliminate extractives and water. This is particularly suitable for the elimination of unpleasant gamy flavors from wild meats or to reduce salt content of food that has been unpleasantly salted. This process and operation of the machine is similar to that of Example II except that no cycling is done until the cooking is actually started.

*Example V*

This particular example contemplates a rapid build-up of pressure with a very slow release of pressure over a wide range of pressures which is particularly suitable in cooking meats when moisture and barbecue flavors are desired to be forced into the meats and retained there. This is particularly adapted for preparing barbecued meats. In this process the exhaust valve 42 is opened slightly and the action switches 75 and 76 are set over a large range, for example, from atmosphere to twenty-one pounds. The valve 39 is adjusted to permit $CO_2$ to enter the oven rapidly. If desired a liquid smoke or other flavoring may be placed in the baster 43 for forcing flavor into the barbecue most effectively. Thus, the pressure is built-up rapidly to a high pressure and released slowly from the pressure chamber and the meat may be flavored as desired. The other steps are the same as mentioned in connection with the other processes.

*Example VI*

In some instances it is desirable to maintain a high pressure at a substantially constant level which is particularly adaptable and useful in conserving the maximum of water in the meat and minimizing loss of fat. The formation of carbonic acid by the action of the $CO_2$ and water tends to hold the water in the meat structure. Thus, water in the food is maintained by the formation of a chemical compound, carbonic acid. In this process the food is attached to the spit, the drip pan attached, the pressure cylinder attached and the bleeder valve 47 closed, the spit motor 48 and valve to the $CO_2$ converter or cylinder 16 are manipulated as previously mentioned. The valve 39 is regulated to allow $CO_2$ to enter the oven slowly and when the pressure, as indicated on the pressure gauge 50, and the oven has reached the desired level, then the bleeder valve 47 is opened to bleed off gases as rapidly as they enter the oven. It should also be noted, that cooking may be done under atmospheric pressures by merely leaving the bleeder valve 47 open, in which event the cooking is done under atmospheric pressure in an atmosphere of $CO_2$.

It is understood that the above Examples I through VI, may be used by using air from the cylinder 17 instead of $CO_2$ by manipulating the valves in the manifold 35. Also, a combination of $CO_2$ and air may be used depending upon the desired result. Also, the pressure oven 19 may be used as an ordinary rotisserie by merely not closely attaching the pressure cylinder 23 to the cover 24 and leaving a sufficiently wide crack for air to enter and moisture and odors to escape.

The muffler 21 is particularly advantageous and useful in serving as a deodorizer, particularly in cooking gamy meats and other foods which have a strong odor. To this end the trays 21a are placed in the muffler 21 and any conventional deodorizing material is placed on the trays for eliminating odors from the gases discharging from the muffler 21.

It is therefore apparent that the present invention provides a flexible method of and means for cooking and attains the ends, objects and advantages mentioned as well as others inherent therein. Also, any conventional or equivalent parts may be substituted for the various elements and rearrangement of parts and steps of the processes will readily suggest themselves to those skilled in the art. Accordingly, the present invention is to be limited only by the spirit and the scope of the appended claims.

What is claimed is:

1. Cooking apparatus comprising a pressure tight oven, a heating element in the oven, a rotatable spit in the oven, means for rotating the spit, inlet means for introducing gas under pressure into the oven, outlet means for discharging the gas from the oven, an inlet valve and an outlet valve in the inlet means and outlet means, respectively, for controlling inflow and outflow of the gas to and from the oven, one of said valves being open while the other is closed, pressure control means in pressure communication with the oven controlling opening and closing of said valves in response to predetermined maximum and minimum pressures in the oven, temperature control means for controlling the temperature of the heating element, and a timer connected to the heating element for preselecting the time interval of heating by the heating element.

2. Cooking apparatus comprising, a pressure tight oven, a heating element in the oven, a rotatable spit in the oven, inlet means for introducing gas under pressure into the oven, outlet means for discharging the gas from the oven, an inlet valve and an outlet valve in the inlet means and outlet means, respectively, for controlling inflow and outflow of the gas to and from the oven, one of said valves being open while the other is closed, pressure control means in pressure communication with the oven controlling opening and closing of said valves in response to predetermined maximum and minimum pressures in the oven, and a lubricator in the inlet means for providing moisture to the gas.

3. A cooking apparatus comprising a pressure tight oven, heating means in the oven, inlet means for introducing gas under pressure into the oven, outlet means for discharging gas from the oven, and inlet valve and an outlet valve in the inlet means and outlet means, respectively, for controlling inflow and outflow of the gas to and from the oven, one of said valves being open while the other is closed, pressure control means in pressure communication with the oven controlling opening and closing of said valves in response to predetermined maximum and minimum pressures in the oven, and a deodorizer on the outlet means for deodorizing the gas discharged from the oven.

4. Cooking apparatus comprising a pressure tight oven, heating means in the oven, inlet means for introducing gas under pressure into the oven, outlet means for discharging the gas from the oven, an inlet valve and an outlet valve in the inlet means and outlet means, respectively, for controlling inflow and outflow of the gas to and from the oven, one of said valves being open while the other is closed, pressure control means in pressure communication with the oven controlling the opening and closing of said valves in response to predetermined maximum and minimum pressures in the oven, choke means in the inlet and outlet means for regulating rate of flow of the gas therein, a pair of valved containers for carbon dioxide and air, and a manifold connecting the containers to the inlet means.

5. Cooking apparatus comprising, a pressure tight oven, heating means in the oven, inlet means for introducing gas under pressure into the oven, outlet means for discharging the gas from the oven, an inlet valve and an outlet valve in the inlet means and outlet means, respectively, for controlling inflow and outflow of the gas to and from the oven, one of said valves being open while the other is closed, pressure control means in pressure communication with the oven controlling opening and closing of said valves in response to predetermined maximum and minimum pressures in the oven, and a lubricator in the inlet means for providing moisture to the gas.

6. A cooking apparatus comprising, a pressure tight oven, heating means in the oven arranged to produce a cooking temperature in the oven, inlet means in the oven for introducing gas under pressure into the oven, outlet means in the oven for discharging the gas from the oven, an inlet motor valve and an outlet motor valve in the inlet and outlet means, respectively, controlling inflow and outflow of the gas to and from the oven, said valves being arranged so that one of said valves is open while the other is closed, and automatic valve-operating means for opening and closing said motor valves, said valve-operating means including a pressure responsive switch in pressure communication with the oven, means electrically linking the pressure responsive switch to said inlet motor valve and to said outlet motor valve, said pressure responsive switch arranged to open said outlet motor valve and to close said inlet motor valve at a predetermined maximum pressure in the oven and to close said outlet valve and to open said inlet valve at a predetermined minimum pressure in the oven thereby providing regular cycles of minimum and maximum pressures in the oven.

7. A cooking apparatus comprising, a pressure tight oven, a rotatable spit in the oven, heating means in the oven arranged to produce a cooking temperature in the oven, inlet means in the oven for introducing gas under pressure into the oven, outlet means in the oven for discharging the gas from the oven, an inlet motor valve and an outlet motor valve in the inlet and outlet means, respectively, controlling inflow and outflow of the gas to and from the oven, said valves being arranged so that one of said valves is open while the other is closed, and automatic valve-operating means for opening and closing said motor valves, said valve-operating means including a pressure responsive switch in pressure communication with the oven, means electrically linking the pressure responsive switch to said inlet motor valve and to said outlet motor valve, said pressure responsive switch arranged to open said outlet motor valve and to close said inlet motor valve at a predetermined maximum pressure in the oven and to close said outlet valve and to open said inlet valve at a predetermined minimum pressure in the oven thereby providing regular cycles of minimum and maximum pressures in the oven.

References Cited in the file of this patent

UNITED STATES PATENTS

| | | |
|---|---|---|
| 995,353 | Kiesel | June 13, 1911 |
| 2,002,057 | Gregg | May 21, 1935 |
| 2,305,056 | Austin | Dec. 15, 1942 |
| 2,378,950 | Reich | June 26, 1945 |
| 2,515,879 | Korn | July 18, 1950 |
| 2,558,294 | Finizie | June 26, 1951 |
| 2,597,825 | Schroeder | May 20, 1952 |
| 2,654,307 | Nisenson | Oct. 6, 1953 |